(12) United States Patent
Liu et al.

(10) Patent No.: US 11,706,730 B2
(45) Date of Patent: Jul. 18, 2023

(54) TIME SYNCHRONIZATION METHOD AND ELECTRONIC DEVICE

(71) Applicant: ZTE CORPORATION, Guangdong (CN)

(72) Inventors: Wei Liu, Guangdong (CN); Jie Chen, Guangdong (CN); Xianjun Lu, Guangdong (CN); Xiong Pan, Guangdong (CN); Liang Yan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 95 days.

(21) Appl. No.: 17/418,952

(22) PCT Filed: Dec. 23, 2019

(86) PCT No.: PCT/CN2019/127419
§ 371 (c)(1),
(2) Date: Jun. 28, 2021

(87) PCT Pub. No.: WO2020/135332
PCT Pub. Date: Jul. 2, 2020

(65) Prior Publication Data
US 2022/0124655 A1  Apr. 21, 2022

(30) Foreign Application Priority Data

Dec. 28, 2018 (CN) .......................... 201811627876.3

(51) Int. Cl.
*H04W 56/00* (2009.01)
*H04L 7/033* (2006.01)
*H04L 7/06* (2006.01)

(52) U.S. Cl.
CPC ....... *H04W 56/0035* (2013.01); *H04L 7/0331* (2013.01); *H04L 7/06* (2013.01); *H04W 56/001* (2013.01)

(58) Field of Classification Search
CPC ... H04L 7/0008; H04L 7/0033; H04L 7/0037; H04L 7/005; H04L 7/033; H04L 7/0331;
(Continued)

(56) References Cited

U.S. PATENT DOCUMENTS

2011/0298508 A1* 12/2011 Wu ........................ H04L 7/0337
327/158
2019/0132813 A1* 5/2019 Jiang .................... G01R 33/422

FOREIGN PATENT DOCUMENTS

CN          108111245 A * 6/2018 ............ H04J 3/0638

* cited by examiner

*Primary Examiner* — Young T. Tse
(74) *Attorney, Agent, or Firm* — Li & Cai Intellectual Property (USA) Office

(57) ABSTRACT

The present application provides a time synchronization method and an electronic device. The method includes sending a clock synchronization signal and first real time clock (RTC) information separately; and the clock synchronization signal is configured to measure a delay between a first module and at least one second module, the delay is used for phase compensation performed on the clock synchronization signal received at the side of the at least one second module, and the clock synchronization signal after being subjected to the phase compensation is configured to trigger the at least one second module to update local second RTC information to the first RTC information.

18 Claims, 3 Drawing Sheets

(58) Field of Classification Search
CPC ...... H04L 7/0337; H04L 7/06; H04W 56/001; H04W 56/0035
USPC .............. 375/354, 356, 362, 371, 373, 376; 327/144, 146, 147, 149, 153–156, 161; 370/516, 517; 713/400, 401, 600
See application file for complete search history.

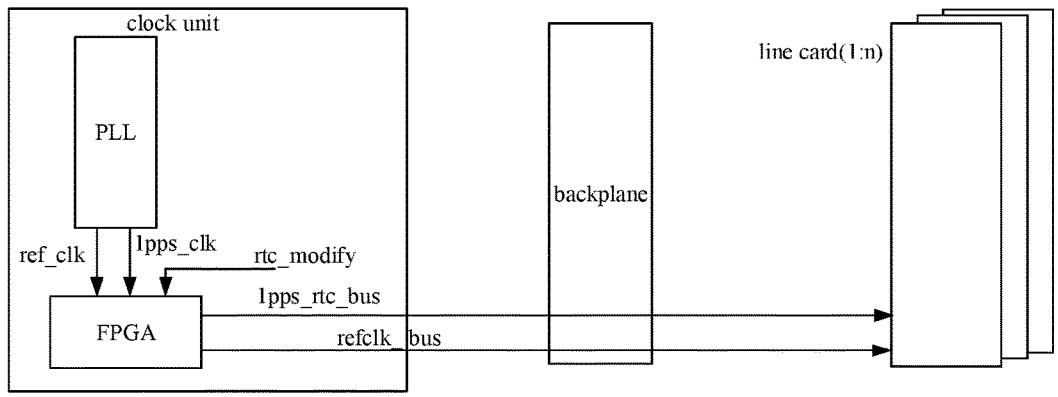

-- Prior Art --

Fig. 1 send a clock synchronization signal and first RTC information separately, with the clock synchronization signal configured to measure a delay between a first module and at least one second module, the delay used for phase compensation performed on the clock synchronization signal received at the side of the second module, and the clock synchronization signal after being subjected to the phase compensation configured to trigger the second module to update local second RTC information to the first RTC information    201

Fig. 2

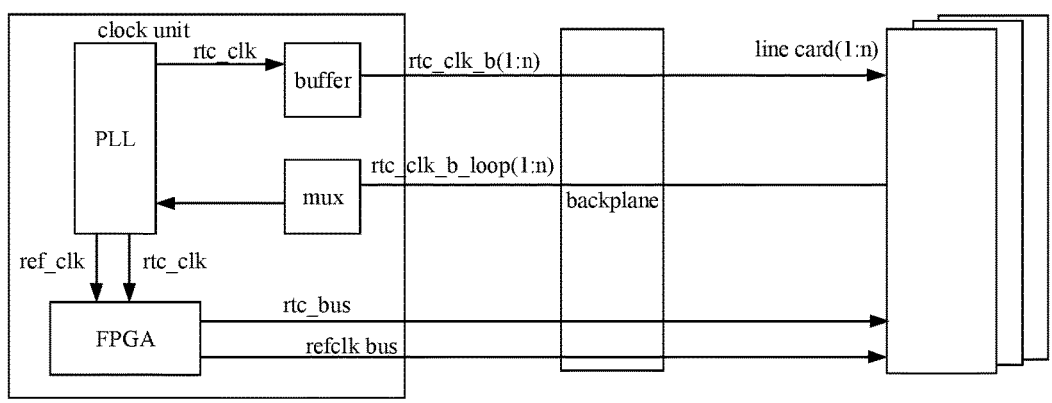

Fig. 3

TIME SYNCHRONIZATION METHOD AND ELECTRONIC DEVICE

TECHNICAL FIELD

The present disclosure relates to, but is not limited to, the time synchronization technology.

BACKGROUND

Next generation mobile communication, i.e., 5th Generation (5G) mobile communication, has higher requirements for a time synchronization network. In some networks, such as a backhaul network, a fronthaul network and other bearer networks, a single node device has a synchronization requirement of nanosecond (ns) level or even sub-ns level relative to a time source. However, a current distribution method of Real Time Clock (RTC) information causes some delay uncertainties of paths, such as a delay uncertainty of a driver, a delay uncertainty of routing and a delay uncertainty of encoding/decoding, resulting in a decrease in time synchronization accuracy.

SUMMARY

An embodiment of the present disclosure provides a time synchronization method, including sending a clock synchronization signal and first RTC information separately; and the clock synchronization signal is configured to measure a delay between a first module and at least one second module, the delay is used for phase compensation performed on the clock synchronization signal received at the side of the second module, and the clock synchronization signal after being subjected to the phase compensation is configured to trigger the second module to update local second RTC information to the first RTC information.

An embodiment of the present disclosure further provides an electronic device, including a first module configured to send a clock synchronization signal and first RTC information separately, and a second module. The clock synchronization signal is configured to measure a delay between the first module and at least one second module, the delay is used for phase compensation performed on the clock synchronization signal received at the side of the second module, and the clock synchronization signal after being subjected to the phase compensation is configured to trigger the second module to update local second RTC information to the first RTC information.

BRIEF DESCRIPTION OF THE DRAWINGS

Exemplarily but not restrictively, the drawings generally illustrate all the embodiments discussed herein.

FIG. 1 is a block diagram illustrating an RTC distribution scheme in a system satisfying CLASS A/B of G.8273.2;

FIG. 2 is a flowchart illustrating a time synchronization method according to an embodiment of the present disclosure;

FIG. 3 is a block diagram illustrating an RTC distribution scheme in a system according to an embodiment of the present disclosure;

DETAILED DESCRIPTION

Figure 4:
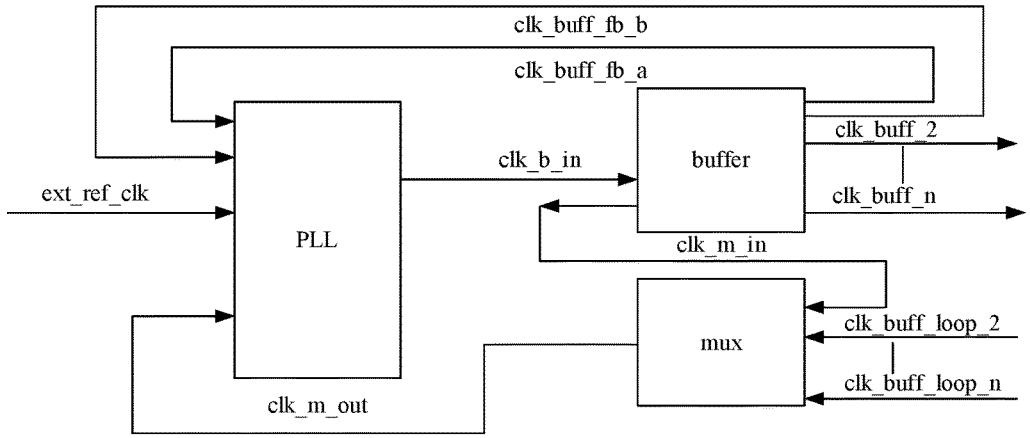
FIG. 4 is a schematic diagram illustrating measurement of delays using loopback transmission according to an embodiment of the present disclosure.

The technical solutions provided by the embodiments of the present disclosure are described below with reference to the drawings of the embodiments of the present disclosure. It is obvious that the embodiments described herein are merely some embodiments of the present disclosure, rather than all the embodiments of the present disclosure. All other embodiments derived by those of ordinary skill in the art from the embodiments disclosed herein without making any creative effort shall be considered to fall within the protection scope of the present disclosure.

Unless specifically stated, the time described in the embodiments of the present disclosure refers to RTC information.

For a node device in a time synchronization network, a distribution scheme of RTC information in a system of the node device is as follows: RTC information is encoded on a 1 pulse per second (1 pps) signal by a Field-Programmable Gate Array (FPGA), and is distributed to each line card via a bus by a system backplane; then the 1 pps signal and the RTC information are regenerated through decoding by the line card, a service chip of the line card uses a rising edge of the regenerated 1 pps signal to represent the information of whole second, and the rising edge of the 1 pps signal is configured to trigger the service chip to update the RTC information including specific time information. However, this method causes a number of delay uncertainties of paths, including 1) a delay uncertainty of a driver; 2) a delay uncertainty of the backplane; and 3) a delay uncertainty of encoding/decoding of the RTC information.

1) The Delay Uncertainty of the Driver

Delay uncertainties (affected by environments and voltages) of conventional drivers are about 2 ns. Even for the buffers adopting a specific process, the delay uncertainties of the buffers of the same brand are about 30 ps (picosecond), and the delay differences among the buffers of different brands are in a range of 300 ps to 2 ns; and the delay uncertainties of the buffers adopting the Complementary Metal Oxide Semiconductor (CMOS) process is in a range of 300 ps to 2 ns. The delay differences cannot be made up by the above distribution scheme of RTC information.

2) The Delay Uncertainty of the Backplane

The wiring of the backplane adopts a structure of a bus and multiple branches, and a delay uncertainty of a clock signal along the bus may reach 2 ns due to a difference in the number of the cards inserted in the slots according to system configuration. In addition, the delay uncertainties vary depending on the system configuration. The delay uncertainties cannot be eliminated by the above distribution scheme of RTC information.

3) The Delay Uncertainty of Encoding/Decoding of the RTC Information

When the FPGA encodes or decodes the RTC information, a delay uncertainty error of an edge of the decoded (i.e., regenerated) 1 pps signal caused by the delay uncertainties such as the delay uncertainty of the buffer is close to 2 ns.

In addition, the FPGA in a main control center has a sampling error of RTC information: a drive clock for the RTC information is not consistent with a clock used for synchronous update (a signal corresponding to the clock used for synchronous update is referred to as a clock synchronization signal in the embodiments of the present disclosure), so that a sampling error of several nanoseconds is caused when the RTC information is updated based on the clock synchronization signal.

The errors caused by the above delay uncertainties which cannot be compensated for are more than ten nanoseconds. Since a delay of a future 5G node device is required to be less than 5 ns, it is necessary to eliminate or compensate for the above delay uncertainties.

FIG. 1 is a block diagram illustrating an RTC distribution scheme in a system satisfying CLASS A/B of G.8273.2, and RTC distribution errors of several to ten nanoseconds are negligible in this RTC distribution scheme. An accuracy requirement of the highest T-BC class (CLASS B) in G.8273.2 is +/−70 ns.

In a specific implementation process, a clock unit (a timing card) includes a Phase Locking Loop (PLL) and an FPGA. The clock unit is also referred to as a main control center, the PLL of the main control center locks onto an external standard clock, such as 1 pps signals provided by a Global Positioning System (GPS), filters out the jitter of the 1 pps signal, generates a 1 pps clock signal (1 pps_clk) and a reference clock signal (ref_clk) after being subjected to frequency multiplication, and sends 1 pps ref and ref_clk to the FPGA. The FPGA maintains RTC information according to 1 pps_clk and ref_clk, and the RTC information can be adjusted via an external interface (rtc_modify) of the FPGA. The FPGA encodes the RTC information on a 1 pps clock signal (referred to as a 1 pps_rtc signal), and then distributes to each line card of the system through a bus (1 pps_rtc_bus). It should be noted that the line cards shown in FIG. 1 are merely an example and do not constitute any limitation, and the line cards may be replaced with interface card units. Then an FPGA of each line card decodes the 1 pps_rtc signal to regenerate the 1 pps clock signal and the RTC information including specific time information, and an edge of the 1 pps clock signal, such as a rising edge, is configured to represent an accurate whole second. refclk_bus is a clock distributed by the timing card to each line card through the bus and is used as a drive reference clock of an RTC of the line card.

In the scheme illustrated by FIG. 1, a delay of a driver along the transmission path is neglected and leads to an error of several nanoseconds; an error of 2 ns is caused by the bus considering a typical value used for a distribution delay of the bus; and the decoding of the 1 pps clock signal further leads to an error of several nanoseconds at the edge of the 1 pps clock signal.

In view of the above, the present disclosure provides a time synchronization method and an electronic device, so as to avoid one or more of the problems caused by the limitations of the related art. According to an embodiment of the present disclosure, a clock synchronization signal and RTC information are separately transmitted on two paths, so that the delay uncertainty caused by the encoding/decoding of the clock synchronization signal is avoided; meanwhile, a delay between two modules is measured based on the clock synchronization signal and the clock synchronization signal is subjected to phase compensation according to the delay, so that a delay caused can be reduced to an extremely small order of magnitude, thereby improving time synchronization accuracy.

FIG. 2 is a flowchart illustrating a time synchronization method according to an embodiment of the present disclosure. As shown in FIG. 2, the time synchronization method may include: step 201, sending a clock synchronization signal and first RTC information separately. The clock synchronization signal is configured to measure a delay between a first module and at least one second module, the delay is used for phase compensation performed on the clock synchronization signal received at the side of the second module, and the clock synchronization signal after being subjected to the phase compensation is configured to trigger the second module to update local second RTC information to the first RTC information.

In the embodiment of the present disclosure, the time synchronization method is applied to an electronic device, which may be, but is not limited to, a node device in a time synchronization network. Further, the electronic device includes a first module and a second module, and the first module is a clock unit (a timing card) and is configured to distribute RTC information to one or more second modules so as to allow the one or more second modules to synchronously update local RTC information based on the RTC information of the first module. The second module is a line card or an interface card unit. It should be noted that the first module can output one or multiple clock synchronization signals, each of which corresponds to one second module.

In the embodiment of the present disclosure, the first module separately sends the clock synchronization signal and the RTC information to the second module through two independent channels, where the RTC information is encoded on the clock synchronization signal. The clock synchronization signal is configured to measure the delay between the first module and the at least one second module, the delay is used for phase compensation performed on the clock synchronization signal received at the side of the second module, and the clock synchronization signal after being subjected to the phase compensation is configured to trigger the second module to update the local second RTC information to the first RTC information. With the clock synchronization signal and the RTC information separately transmitted on two paths, the delay of the rising edge caused by the decoding of the clock synchronization signal is avoided; meanwhile, the delay between the two modules is measured based on the clock synchronization signal to perform the phase compensation accordingly, so that the delay caused can be reduced to an extremely small order of magnitude. The technical solution provided by the embodiment of the present disclosure achieves accurate distribution of the RTC information in the system (an error is less than 100 ps).

In the embodiment of the present disclosure, the clock synchronization signal is transmitted between the first module and the at least one second module in a loopback manner, and the transmission in a loopback manner is configured to measure the delay between the first module and the at least one second module.

For example, the first module sends a clock synchronization signal to the second module, the second module loops the clock synchronization signal back to the first module after receiving the same, and the first module can determine the delay between the first module and the second module based on the received clock synchronization signal.

How to measure the delay is described below in conjunction with a specific implementation of the first module.

The first module includes a first PLL and a logic device. The first PLL separately sends the clock synchronization signal to the second module and the logic device, and receives the clock synchronization signal looped back by the second module. The logic device receives the clock synchronization signal sent by the first PLL, encodes the RTC information on the clock synchronization signal and sends to the second module.

The first PLL may be provided with one or more output ports, each of which can output one clock synchronization signal. If a large number of second modules are provided and the number of the output ports of the first PLL is smaller than that of the second modules, a port expansion device and a multiplexing device may be added to the first module, the port expansion device is configured to increase the number of the output ports of the first PLL, receive the clock synchronization signal sent by the first PLL and send multiple clock synchronization signals to a plurality of second modules; and the multiplexing device is configured to receive multiple clock synchronization signals looped back by the plurality of second modules, select one clock synchronization signal from the multiple clock synchronization signals, and loop the selected clock synchronization signal back to the first PLL.

FIG. 3 is a block diagram illustrating an RTC distribution scheme in a system according to an embodiment of the present disclosure. In FIG. 3, the clock unit (a timing card) serves as the first module, the line card serves as the second module, the PLL serves as the first PLL, the FPGA serves as the logic device, the buffer serves as the port expansion device, the mux serves as the multiplexing device, the backplane serves as a backplane between the first module and the second module, and n line cards are provided and denoted by line card (1:n). The PLL outputs a clock synchronization signal (rtc_clk) to the buffer, the buffer outputs n clock synchronization signals (rtc_clk_b(1:n)) in one to one correspondence with the n line cards (line card (1:n)), the n line cards (line card (1:n)) loop n clock synchronization signals (rtc_clk_b_loop(1:n)) back to the mux, the mux selects one clock synchronization signal (e.g. rtc_clk_b_loop2 corresponding to the line card 2) and loops the selected clock synchronization signal back to the PLL, and then the PLL can measure a delay of the line card 2 relative to the PLL of the timing card; and the mux can select each of the clock synchronization signals through polling, so that the PLL can measure a delay of each line card relative to the PLL of the timing card.

At the same time, the PLL sends the clock synchronization signal (rtc_clk) to the FPGA, the FPGA encodes the maintained RTC information on the clock synchronization signal and sends to the line cards through a system bus (rtc_bus).

In FIG. 3, in addition to providing a system clock (ref_clk) necessary for the system, the PLL in the timing card (i.e., the main control center) generates the clock synchronization signal (rtc_clk) with good short-time stability. Moreover, the PLL needs to measure not only a loopback delay but also delays of the buffer and the mux that may be added. Besides maintaining reference RTC information of the system, the FPGA in the timing card (i.e., the main control center) needs to perform encoding and distribution functions on the RTC information, with a distribution frequency consistent with the clock corresponding to the clock synchronization signal (rtc_clk). Furthermore, in addition to providing the functions (such as seamless switching) of a conventional clock of a line card, the PLL in the timing card (i.e., the main control center) is required to provide the following functions of:

A) inputting and outputting with a fixed delay and automatically testing its own delay;

B) transmitting a synchronous clock distributed by the main control center in a loopback manner;

C) testing a delay of a synchronous clock of the line card; and

D) expanding using the mux/buffer in the case where the PLL is provided with insufficient input and output ports.

As illustrated by FIG. 1, the 1 pps clock signal is used as the clock synchronization signal, the RTC information is encoded on the 1 pps clock signal and is sent to the line card through the bus, a synchronization error is caused at the edge of the 1 pps clock signal due to the delay variation caused by a change of the number of the line cards inserted in the slots, that is, the number of loads, and the synchronization error is irregular and cannot be compensated for. Compared with the distribution scheme illustrated by FIG. 1, the distribution scheme illustrated by FIG. 3 adopts a point-to-point topology, that is, the wiring is such configured that the multiple outputs of the timing card are in one to one correspondence with the line cards, so as to avoid the influence of the delay variation caused by the random change of loads; in FIG. 3, 1 to n line cards are taken as an example and are denoted by line card (1:n). On the other hand, as illustrated by FIG. 1, since the RTC information is transmitted with the 1 pps clock signal used as the clock synchronization signal, the 1 pps clock signal is encoded by the FPGA in the main control center, and is decoded by the FPGA in the line card to regenerate the 1 pps clock signal, and the edge of the 1 pps clock signal is configured to represent the information of whole second; however, the edge is damaged due to the encoding and the decoding, that is, generating a delay fluctuation, which cannot be compensated for. In view of the delay fluctuation, as illustrated by FIG. 3, the clock synchronization signal and the RTC information are separately transmitted, and the clock synchronization signal is no longer encoded and is driven directly to the line card. In another aspect, as illustrated by FIG. 1, a transmission delay of the 1 pps clock signal used as the clock synchronization signal takes a typical value obtained by a practical test, but the accuracy of a test value obtained in the practical test may be deviated because of actual test instruments, testers and changes of subsequent operation environments of devices; in view of the above, as illustrated by FIG. 3, the transmission delay of the clock synchronization signal is tested in real time in a loopback way, so as to eliminate the above deviation of the accuracy of the test value. In yet another aspect, as illustrated by FIG. 1, the RTC maintenance by the FPGA in the main control center is realized by updating based on the sampling of the clock synchronization signal (also referred to synchronization update pulse) by a high-frequency clock, which leads to a sampling error decided by a frequency of the sampling clock, and an error of 2 ns to 3 ns may exist according to an operating clock with the highest frequency of the current FPGA; as illustrated by FIG. 3, the increase of the RTC information is directly driven by the clock synchronization signal, and the time which is in consistent with a synchronous update clock represented by the clock synchronization signal is corrected with software, thereby eliminating the sampling error.

Since the new service requirement is that the time synchronization accuracy of a single node device cannot be greater than 5 ns, a distribution error of RTC information in a distributed system needs to be overcome to a negligible level. The distribution scheme illustrated by FIG. 3 can decrease the distribution error to be less than 100 ps, and leave a design margin for the other processes of the system.

How to measure the delays is described below in detail.

1) The Delay of the First PLL

The first PLL is provided with a first outer loopback line and a second outer loopback line, the first and second outer loopback lines are looped from an output of the first PLL back to an input of the first PLL; the first PLL outputs a first clock synchronization signal and the first clock synchronization signal is looped back to the first PLL via the first outer loopback line, the first PLL outputs a second clock synchronization signal and the second clock synchronization signal is looped back to the first PLL via the second outer loopback line, and the first and second clock synchronization signals are used by the first PLL to measure the delay thereof.

The first PLL locks onto a reference clock signal, and an edge of the first clock synchronization signal is aligned with an edge of the reference clock signal when the first PLL locks.

2) The Delay of the Multiplexing Device

The port expansion device outputs a third clock synchronization signal and the third clock synchronization signal is looped back to the first PLL by the multiplexing device. A specified delay exists between the third clock synchronization signal output by the port expansion device and the first clock synchronization signal, so that the first PLL can measure the delay of the multiplexing device based on the received third clock synchronization signal.

3) The Delay of the Port Expansion Device

The port expansion device outputs a fourth clock synchronization signal and the fourth clock synchronization signal is looped back to the first PLL, and the first PLL measures the delay of the port expansion device based on the received fourth clock synchronization signal.

4) The Delay of the Backplane

The multiplexing device selects one clock synchronization signal from the multiple clock synchronization signals and loops the selected clock synchronization signal back to the first PLL, so that the first PLL can measure the delay of the backplane between the first module and the second module based on the received clock synchronization signal.

5) In the case where the first module is not provided with the port expansion device or the multiplexing device, the clock synchronization signals are configured to measure the delay of the first PLL and the delay of the backplane between the first module and the second module. In the case where the first module is provided with the port expansion device and the multiplexing device, the clock synchronization signals are configured to measure the delays of the first PLL, the port expansion device, the multiplexing device, and the backplane between the first module and the second module. The measured delays of the devices are configured to determine the delay between the first PLL and the second module.

FIG. 4 is a schematic diagram illustrating measurement of delays using loopback transmission according to an embodiment of the present disclosure. With reference to FIG. 4, the PLL, the buffer and the mux are all located in a timing card (i.e., a main control center), the timing card serves as the first module, the PLL serves as the first PLL, the buffer serves as the port extension device, the mux serves as the multiplexing device, clk_b_in is the clock synchronization signal output by the PLL to the buffer, clk_buffer_fb_a is the first clock synchronization signal looped back to the PLL by the buffer, and clk_buffer_fb_b is the second clock synchronization signal looped back to the PLL by the buffer. clk_buff_2 to clk_buff_n are the clock synchronization signals output by the buffer to the line card 2 to the line card n respectively. clk_buff_loop_2 to clk_buff_loop_n are the clock synchronization signals looped back to the mux by the line card 2 to the line card n respectively. clk_m_in is the third clock synchronization signal sent by the buffer to the mux, and clk_m_out is the third clock synchronization signal looped back to the PLL by the mux. FIG. 4 does not show the fourth clock synchronization signal, and it should be noted that the loopback manner of the fourth clock synchronization signal is the same as that of clk_buff_fb_b.

In FIG. 4, the PLL locks onto an external high-level reference clock signal (ext_ref_clk), and an input and output delay of the PLL is stabilized by means of outer loopback; for overcoming the limitation of the input and output ports of the PPL, the buffer is added to increase the fan-out, and the mux is added to select an input to loop back to the input port of the PLL. FIG. 4 illustrates real-time measurement of the input and output delay of the PLL (referred to as the delay of the PLL for short), the delay of the mux and the delay of the buffer; for achieve the real-time measurement of those delays, the buffer and the mux are subjected to a loopback test and loopback lines are configured in an agreed wiring manner, so as to obtain a real-time delay value of each device. In addition, the PLL also measures the delay of the backplane. In FIG. 4, the buffer is used as an expanded output port of the PLL, and outer loopback of the PLL is from an output of the buffer to an input of the PLL, and an edge of a loopback signal clk_buff_fb_a, such as a rising edge, is aligned with an edge of ext_ref_clk when the PLL locks. The edge of clk_buff_fb_a is taken as a reference by the PLL in a subsequent test of phase difference. How to measure the delay of each device is illustrated below by examples in conjunction with FIG. 4.

1) The Delay of the PLL

An initial phase of the clock synchronization signal output to the line card, such as clk_buff_2, is not aligned with an input phase of clk_buff_fb_a at the PLL, resulting in a line delay of clk_buff_fb_a, which is the delay of the PLL. According to the embodiment of the present disclosure, the delay of the PPL is tested automatically. It should be noted that the automatic test of the delay of the PLL requires that the lines on a circuit board for a signal to be tested are designed according to certain constraints, so as to ensure the stability of the tested delay.

clk_buff_fb_b is output from the buffer and input to the PLL. According to the embodiment of the present disclosure, a phase difference measurement function of the PLL implemented by a Time-to-Digital Converter (TDC) is used to measure a phase difference (i.e., a delay), and the phase difference (clk_buff_fb_b-clk_buff_fb_a) is a line delay of the loopback of clk_buff_fb_a and is assumed to be TDC0, which is used for correction and compensation in all subsequent measurements by the TDC.

2) The Delays of the Buffer and the Mux

When the delay is measured through a loopback test, it is required that a transmission line and a loopback line are symmetrical. Since the mux is added in a loopback direction of the delay measurement, which introduces the asymmetry of the delay, the delay of the mux needs to be acquired to correct a delay in a transmission direction.

The delay of the mux needs to be measured automatically in real time. When a line delay of the mux and clk_m_out is measured, the mux is configured to select input clk_m_in as an output, with the line of clk_m_in in a known constraint relation with the line of clk_buf_fb_a, and the delay (mux+clk_m_out) measured by the TDC is assumed to be TDC1. The delay of the buffer is measured in the same way as the delay of the mux.

3) The Delay of the Backplane

Taking the measurement of a delay from an output of the buffer of the main control center to a PLL input of a line card as an example, the mux is configured to select clk_buff_loop_2 and output the selected clk_buff_loop_2 to the PLL of the main control center, at this time, a phase difference is measured and is assumed to be TDC2 (obtained by reading a register of the PLL), and the delay from the PLL of the main control center to the line card 2 (assuming that the clock synchronization signal looped back by the line card 2 is clk_buff_loop_2) is (TDC2−TDC1)/2+TDC0.

In the embodiment of the present disclosure, the second module includes a second PLL and a service chip. The second PLL receives the clock synchronization signal sent by the first PLL and loops the clock synchronization signal back to the first PLL; and the service chip receives the clock synchronization signal sent by the second PLL and loops the clock synchronization signal back to the second PLL. The clock synchronization signal is further configured to measure a delay between the second PLL and the service chip. Specifically, the clock synchronization signal is configured to measure a delay of the second PLL and a line delay between the second PLL and the service chip, and the delay of the second PLL and the line delay between the second PLL and the service chip obtained by the measurement are configured to determine the delay between the second PLL and the service chip. How to measure the delays in the second module is described in detail below.

1) The Delay of the Second PLL

The second PLL is provided with a third outer loopback line and a fourth outer loopback line, which are looped from an output of the second PLL back to an input of the second PLL.

The second PLL outputs a fifth clock synchronization signal, and the fifth clock synchronization signal is looped back to the second PLL via the third outer loopback line; the second PLL outputs a sixth clock synchronization signal, and the sixth clock synchronization signal is looped back to the second PLL via the fourth outer loopback line; and the fifth and sixth clock synchronization signals are used by the second PLL to measure the delay thereof.

2) The Line Delay Between the Second PLL and the Service Chip

The second PLL measures the line delay between the second PLL and the service chip based on the clock synchronization signal received from the service chip.

In the embodiment of the present disclosure, a delay between the first PLL and the second PLL and the delay between the second PLL and the service chip are configured to determine a delay between the first PLL and the service chip.

Figure 5:
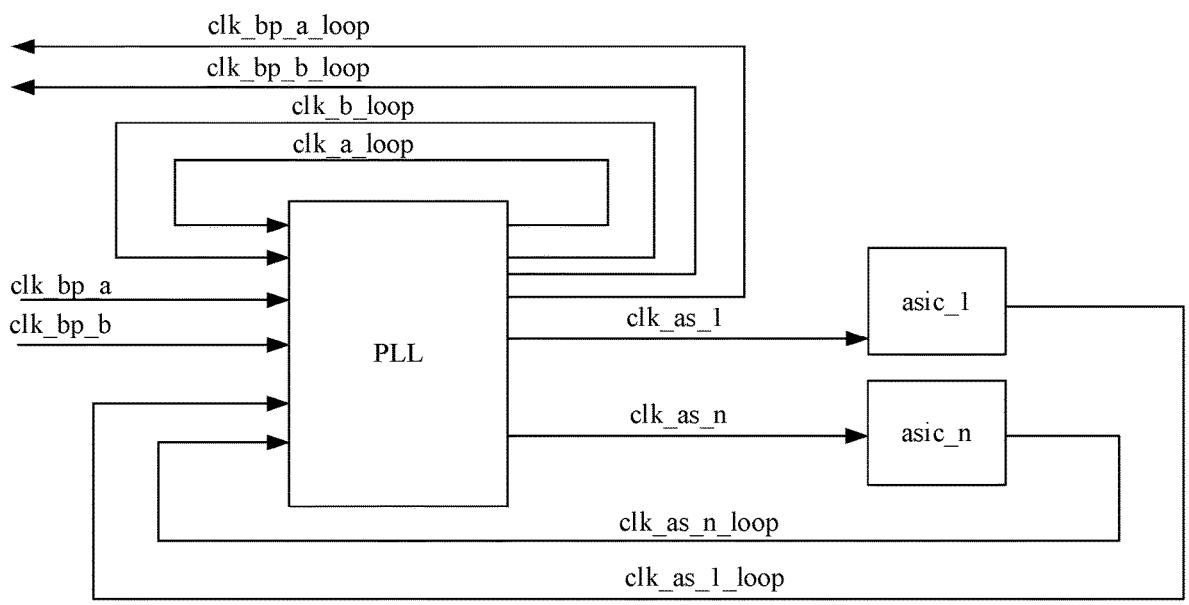
FIG. 5 is a schematic diagram illustrating measurement of a delay of a line card according to an embodiment of the present disclosure.

FIG. 5 is a schematic diagram illustrating measurement of a delay of a line card according to an embodiment of the present disclosure, taking the line card including two service chips, namely asic_1 and asic_n, as an example. With reference to FIG. 5, the PLL, asic_1 and asic_n are all located in the line card, the line card serves as the second module, the PLL serves as the second PLL, and asic_1 and asic_n serve as the service chips. clk_bp_a and clk_bp_b represent the synchronous update clock distributed by the timing card to the line card in the system, and the timing card includes card a and card b, adopting a redundant backup for reliability. clk_bp_a_loop and clk_bp_b_loop are the clock synchronization signals looped back to the timing card by the PLL, clk_a_loop is the fourth clock synchronization signal looped back to an input of the PLL from an output of the PLL, clk_b_loop is the fifth clock synchronization signal looped back to an input of the PLL from an output of the PLL, clk_as_1 is the clock synchronization signal sent by the PLL to asic_1, clk_as_1 loop is the clock synchronization signal looped back to the PLL by asic_1, clk_as_n is the clock synchronization signal sent by the PLL to asic_n, and clk_as_n loop is the clock synchronization signal looped back to the PLL by asic_n.

How to measure the delay in the line card is illustrated below by examples in conjunction with FIG. 5. It should be noted that it is assumed that the output ports of the PLL of the line card in FIG. 5 meet the requirements, and no buffer or mux is needed.

The PLL locks onto the clock synchronization signal distributed by the main control center through outer loopback, the TDC takes a rising edge of clk_a_loop as a reference to carry out the tests, and a line delay of outer loopback of the PLL is tested through loopback along the lines having a constrained relation and is assumed to be TDC_l0. In order to test the delay from the PLL to the service chip in the line card, for example, it is required that a line for clk_as_1 and a line for clk_as_1 loop looped back from the service chip are symmetrical, in which case the loopback delay obtained by the test is TDC_l1, then the delay from the PLL to the service chip is TDC_l1/2+TDC_l0. Based on the above, a transmission delay of the clock synchronization signal corresponding to the RTC distributed by the main control center to the service chip of the line card is as follows:

$$\&t2 = -[(TDC2-TDC1)/2+TDC0+TDC\_l1/2+TDC\_l0]$$

In the embodiment of the present disclosure, the RTC information encoded on the clock synchronization signal is transmitted from the first module to the second module through a bus channel.

In the embodiment of the present disclosure, the RTC information at the side of the first module takes the clock synchronization signal as a drive clock signal, which is used by the first module to increase the RTC information according to a period of the clock synchronization signal. The RTC information at the side of the second module side takes a clock signal at the side of the second module as a drive clock signal, which is used by the second module to increase the RTC information according to a period of the clock signal.

Figure 6:
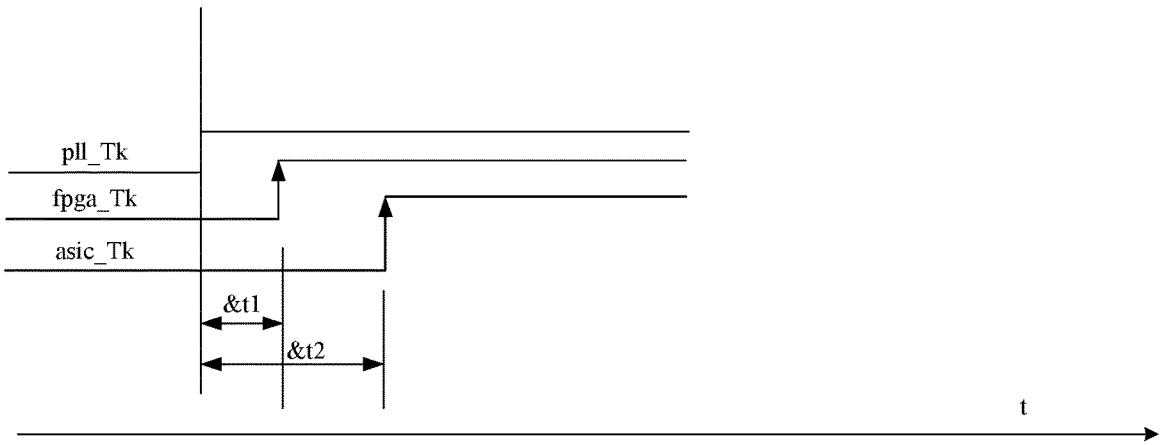
FIG. 6 is a schematic diagram of delays according to an embodiment of the present disclosure.

Specifically, the synchronization, distribution and updating of the RTC information is as follows: it is assumed that a value of the RTC of the FPGA in the main control center is R(t) and R(t)=m×T, where T is a period of the clock synchronization signal. The value of the RTC of the FPGA in the main control center is directly driven by the clock synchronization signal, an offset value is added when the time information shorter than T is updated to an RTC of a slave port at an edge of the synchronous clock according to a protocol, such as the PTP (Precision Time Protocol), and the RTC of the slave port and the RTC of the main control center are synchronized at the edge of the synchronous clock. What is externally presented by a device in practical applications is an RTC of an interface unit, which is not affected by the resolution of a low-frequency synchronous clock of the RTC of the FPGA in the main control center control. The RTC of the main control center is updated according to T, the synchronous clock is not used beyond the edge of T and is only used at an edge of T, and the edge of T can be accurately distributed to the interface unit of the line card (through a point-to-point independent channel). With reference to FIG. 6, one of the synchronous clock signals output by the PLL or the buffer is input to the FPGA for driving the auto-increment of RTC, such synchronous clock signal is assumed to be ftpa_Tk and has a delay of &t1 relative to the output port of the PLL, but the delay of &t1 is not important; since the RTC is maintained according to data, that is, the number of T periods, a delay of the data when being transferred to the interface unit of the line card is not important, as long as the delay does not exceed one T period, which can be easily satisfied. In addition, the distribution of RTC information has an insensitive distribution delay and thus can be driven by an ordinary logic device, which facilitates great initiative in device selection and prevents a high-precision timing distribution device from hitting a bottleneck due to the distribution of RTC in the system. pll_Tk and asic_Tk represent the delays of an edge of a time-distributed synchronous pulse arriving at the PLL and the ASIC.

It is assumed that a value of the RTC of the service chip of the line card is A(t) and A(t)=kns, an RTC clock is 1 Ghz, and a bit width and the like of the RTC are consistent with those of the RTC of the main control center. At a next Tkhz clock edge, such as a rising edge, the RTC of the main control center satisfies R(t)=(m+1)×T; after the rising edge of the synchronous update clock is delayed by &t2, the value of the local RTC of the line card A(t) satisfies A(t)=kns+T+ &T2 ns, and is latched at the edge of the synchronous update clock. After received, the encoded RTC information distributed by the main control center is parsed and compared, that is, A(t)−R(t)−&t2=&t3; since A(t), R(t) and &t2 are known, an offset value between the RTC of the main control center and the RTC of the interface unit of the line card can be obtained; the offset value is updated first before carrying out the comparison in the next period, so as to achieve synchronization. &t2 is a sum of a fixed line delay and the stable delay of the PLL, the final test accuracy is less than 100 ps, that is, the synchronization accuracy is less than 100 ps. Compared with the conventional solutions, the technical solutions provided by the present disclosure improve the synchronization accuracy by two orders of magnitude.

The technical solutions provided by the embodiments of the present disclosure propose distributing the RCT information in the system based on a point-to-point clock edge with a fixed and known delay, and meanwhile realizes automatic real-time measurement of the delays of the added buffer and mux and the line delay of the backplane. According to the embodiments of the present disclosure, the line delays of the synchronous clocks of the backplane and the line card/interface card are used for the automatic measurement and compensation performed on the delay of the driver/mux and the automatic compensation performed on the delay the PLL; and the encoded RTC information and the update clock adopt independent channels, and the synchronous update clock is used as the drive clock of the RTC information of the main control center, which makes a maximum synchronous distribution error not exceed 100 ps. In addition, a time interval of timing information is represented by the edge of the synchronous clock, for example, the synchronous clock is sent independently in a point-to-point manner and is not sent via the same signal line as the encoded RTC information, so that the delay error at the edge caused by regenerating the synchronous clock by encoding and decoding the RTC information can be avoided, and signals are required to be symmetrically looped back (separately looped back to the backplane and the line card/interface card, with a PLL node used as a delay relay) in order to realize an automatic test of the delay of the synchronous clock; and the encoded RTC information is insensitive to the delay and thus can still be transmitted through the original bus channel, thereby saving the lines of the backplane.

The technical solutions provided by the embodiments of the present disclosure can be applied not only to a single-frame distributed system based on multiple slots but also to a single-board box centralized system, the distribution and synchronization timing ports of which are distributed on different service chips, that is, each service chip maintains RTC information independently.

For the single-board system, a PLL selection design for the main control center should meet the following requirements:

A) the PLL needs to input and output with a fixed delay and automatically test its own delay;

B) the main control center distributes a synchronous clock to each service chip of the board;

C) a delay of the synchronous clock of the service chip in the board is tested; and D) the mux/buffer is added for expansion in the case where the PLL is provided with insufficient input and output ports.

For the single-board system, a delay of the PLL with an outer loopback design and a delay of a clock synchronization signal looped back by the service chip can be obtained by tests. On the other hand, a value of an RTC of the main control center is maintained and is synchronized at an RTC port of the device which acquires timing from an upper-level clock. Triggered by a synchronous clock, the RTC information of the service chip is updated using the synchronous clock and the RTC information of the main control center.

In addition to the single-frame distributed system based on multiple slots, the technical solutions provided by the embodiments of the present disclosure can be applied to a complex multi-frame cluster system. For the multi-frame cluster system, in addition to the methods illustrated by FIGS. 2 to 6, a method for measuring a delay between frames is needed. In a multi-frame cluster system, one frame is usually designated as a master frame, and RTC information is synchronized and distributed between the frames through a cable; and a cable delay value needs to be obtained to compensate for the RTC information of a slave frame.

For the multi-frame cluster system, a main control center in the master frame is connected to a main control center in the slave frame through a clock time cable on a panel of a main control board, and the cable is used for synchronization and distribution of RTC; and the cables corresponding to the main frame and the slave frame need to be symmetrical in a transmission direction and a receiving direction.

For the multi-frame cluster system, automatic delay measurement of a distribution driver and a receiving device of a panel of the main control center may be carried out using the test method for the buffer/mux in the methods illustrated by FIGS. 2 to 6.

For the multi-frame cluster system, compensation and correction are carried out through the measurement of a delay of an RTC information distribution cable between the frames and according to the obtained delays of the drive and receiving devices; and the RTC information of the main control center in the slave frame can be synchronized to the RTC information of the main control center in the master frame.

For the multi-frame cluster system, after the RTC information of the main control centers are synchronized between frames, the RTC information of each service port inside the frame is synchronized according to the methods illustrated by FIGS. 2 to 6, so as to realize synchronization of the RTC information inside the frame.

With the above technical solution, the multi-frame cluster system completes the synchronization of the RTC information of each port.

The technical solution provided by the embodiments of the present disclosure can be applied not only to the single-frame distributed system based on multiple slots but also to the switching, routing and transmission devices carried in the system. Moreover, the technical solutions can be applied to a blade server of a data center, and the server is also a multi-slot distributed system. A PLL selection design for the main control center should meet the following requirements:

A) the PLL needs to input and output with a fixed delay and automatically test its own delay;

B) the main control center distributes a synchronous clock to each service chip of the board;

C) a delay of the synchronous clock of the service chip in the board is tested; and D) the mux/buffer is added for expansion in the case where the PLL is provided with insufficient input and output ports.

In addition, delay tests can be carried out using the methods illustrated by FIGS. 2 to 6.

According to the technical solutions provided by the embodiments of the present disclosure, the edge of the clock synchronization signal is used to distribute the RTC information in the system. The transmission delay of the edge of the clock synchronization signal is automatically tested in a loopback way. The RTC information and the clock synchronization signal are transmitted through independent channels, which avoids the damage to the delay of the edge of the clock synchronization signal due to the encoding/decoding of the RTC information. In addition, the PLL adopts an outer loopback locking mode, thereby acquiring a more stable specified delay. The delay of the PLL and the delays of the buffer and the mux are automatically measured in real time, the delay errors caused by the addition of the buffer and the mux are eliminated, and the delay variations of the devices caused by PVT (Process, Voltage and Temperature) are overcome by the real-time measurement, so that the time synchronization accuracy is greatly improved (by at least two orders of magnitude). The clock corresponding to the clock synchronization signal for the delay measurement is directly used as the drive clock of the RTC information of the FPGA of the main control center, with a clock frequency selected depending on the system.

Figure 7:
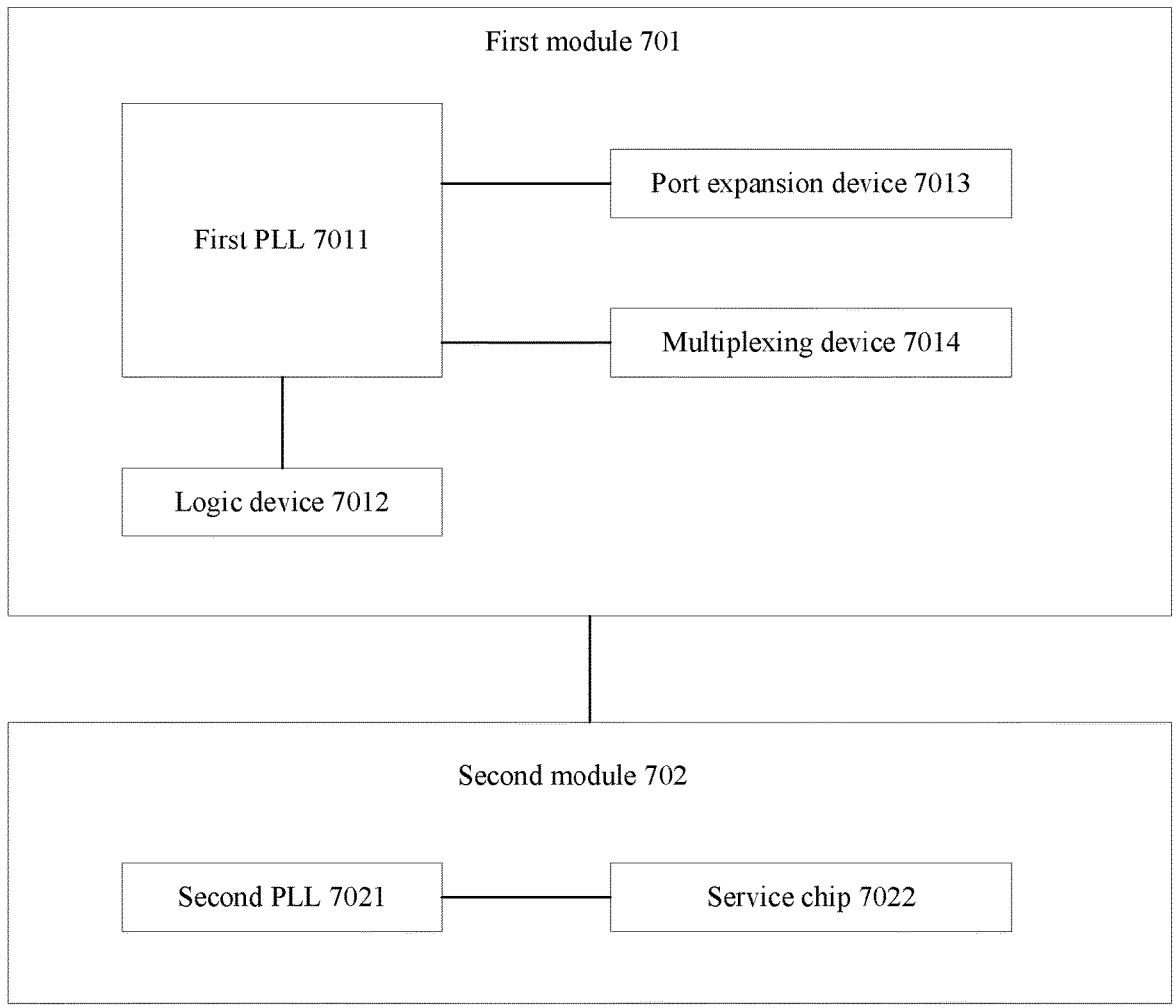
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device includes a first module 701 configured to send a clock synchronization signal and first RTC information separately, and a second module 702. The clock synchronization signal is configured to measure a delay between the first module 701 and the second module 702, the delay is used for phase compensation performed on the clock synchronization signal received at the side of the second module 702, and the clock synchronization signal after being subjected to the phase compensation is configured to trigger the second module 702 to update local second RTC information to the first RTC information.

In an implementation, the clock synchronization signal is transmitted between the first module 701 and the second module 702 in a loopback manner, and the transmission in a loopback manner is configured to measure the delay between the first module 701 and the second module 702.

In an implementation, the first module 701 includes a first PLL 7011 and a logic device 7012. The first PLL 7011 is configured to send the clock synchronization signal to the second module 702 and receive the clock synchronization signal looped back by the second module 702; and the logic device 7012 is configured to receive the clock synchronization signal sent by the first PLL 7011, encode the RTC information on the clock synchronization signal, and send the same to the second module 702.

In an implementation, the first module 701 further includes a port expansion device 7013 and a multiplexing device 7014. The port expansion device 7013 is configured to increase the number of output ports of the first PLL 7011, receive the clock synchronization signal sent by the first PLL 7011 and send multiple clock synchronization signals to a plurality of second modules 702; and the multiplexing device 7014 is configured to receive multiple clock synchronization signals looped back by the plurality of second modules 702, select one clock synchronization signal from the multiple clock synchronization signals, and loop the selected clock synchronization signal back to the first PLL 7011.

In an implementation, the second module 702 includes a second PLL 7021 and a service chip 7022. The second PLL 7021 is configured to receive the clock synchronization signal sent by the first PLL 7011 and loop the clock synchronization signal back to the first PLL 7011; and the service chip 7022 is configured to receive the clock synchronization signal sent by the second PLL 7021 and loop the clock synchronization signal back to the second PLL 7021.

When specifically implemented, the first module 701 is a timing card, which is referred to as a main control center.

When specifically implemented, the first PLL 7011 is a PLL of the main control center, which generates a plurality of stable clock synchronization signals besides each service system clock of the system (a SETS function), and an edge of the clock synchronization signal, such as a rising edge, is configured to update and synchronize RTC information of each line card; the clock synchronization signal also serves as a drive clock of RTC information of an FPGA in the main control center, that is, an RTC value of the main control center is increased according to a clock period of the clock synchronization signal; a service chip of the line card (or an interface card) uses a high-frequency clock or an equivalent high-frequency clock, which is obtained after being subjected to frequency multiplication according to a clock of the clock synchronization signal, to drive the local RTC information, and the resolution below a nanosecond level can be realized; and meanwhile, the synchronous clock is also used for measurement of a distribution delay of RTC information distribution in the system. Moreover, the PLL of the main control center needs to test a phase difference between two input clocks according to the configuration. One PLL is typically needed for carrying out the test of the phase difference, in which case the PLL of the main control center needs to be a multi-channel PLL. In addition, since the output of the PLL is required to be stable for achieving accurate measurement of delays, the PLL is required to have extremely high phase detection resolution. In order to stabilize a delay of the PLL, the PLL needs to be designed in an outer loopback mode, that is, a selected PLL is required to support outer loopback; and meanwhile, a hardware circuit design for the system is required to support automatic measurement of the delay of the PLL.

When specifically implemented, the logic device 7012 serves as the FPGA of the main control center. The FPGA of the main control center uses the synchronous clock provided by the PLL to maintain one RTC which is flipped and increased according to the period of the synchronous clock, the period is assumed to be T, the RTC is synchronized to an RTC of a slave port of the device, the part of the RTC below T is modified and synchronized through software, the granularity of modification and synchronization can be at a picosecond level, a correction value is used to modify the RTC of the slave port according to a protocol, such as the PTP, and meanwhile, an RTC of the FPGA of the main control center is also modified. In practical operation, the RTC of the main control center is modified first.

When specifically implemented, the port expansion device 7013 serves as a buffer of the main control center, and the multiplexing device 7014 serves as a mux of the main control center. Since it is possible that the number of card slots of a distributed system exceeds the number of the output ports of the PLL (because the card slots of different distributed systems vary greatly in number, the output ports of the PLL are unlikely to satisfy all different distributed systems), a multi-output driver (i.e., a buffer) is needed to expand the output ports; and since an input and output delay of the driver varies under the influences of batches and PVT, the delay of the driver needs to be measured in real time to be used as correction data for the whole delay measurement. Similarly, measurement of a delay of the mux is also needed, the mux is added due to the limitation of the input ports of the PLL, and the mux is needed in a multi-slot distributed system to perform selection, so as to allow carrying out the delay tests in turn, that is, realizing time division multiplexing.

In the embodiment of the present disclosure, the clock synchronization signal is transmitted on a backplane between the first module and the second module, and lines on the backplane are configured in a point-to-point manner. A symmetrical loopback line is added in order to enable automatic measurement of a line delay of the backplane.

When specifically implemented, the second module 702 is a line card, the second PLL 7021 is a PLL in the line card, and the service chip 7022 is also located in the line card. The PLL in the line card is configured to loop back the clock synchronization signal sent by the main control center, and test a delay of the clock synchronization signal in the line card. The service chip in the line card maintains RTC information locally, and the RTC information is regularly updated and synchronized to the RTC information of the main control center according to an edge of the clock synchronization signal and a TOD (Time of Day) message issued by the main control center. The RTC information takes a clock provided by the service chip as a drive clock, which is different from the drive clock of the main control center.

In practical applications, four steps are performed. In the first step, a PLL is selected for the main control center, and the PLL is required to be configured with and complete the following functions besides the SETS function required by the devices of the system: 1) the PLL of the main control center is configured to generate multiple synchronous clocks which are then coupled to the line cards in a point-to-point manner. 2) If the number of the slots for the line cards exceeds the number of output channels of the main control center, a driver is added for expanding the output channels of the main control center. 3) Similarly, when the loopback inputs outnumber the input ports of the PLL in the delay measurement, a mux is added to perform selection to allow carrying out the tests in turn. 4) The hardware circuit design of the system needs to provide the PLL with a function of operating in an outer loopback mode. 5) The hardware circuit design of the system needs to provide a function of automatically testing the delay of the PLL. 6) The hardware circuit design of the system needs to provide a function of measuring the delay of the synchronous clock of each line card. 7) The hardware circuit design of the system needs to provide a function of measuring the delay of the driver used for expanding the output ports. 8) The hardware circuit design of the system needs to provide a function of testing the phase difference between the input clocks and a query function for the test results. One synchronous clock output by the PLL is sent to a central controller to serve as an auto-increment drive clock of the RTC, and is configured to trigger the distribution of a value of the RTC to the line cards. One of the functions of the synchronous clock sent to the line card is to update an RTC value, and the specific steps are as follows: an RTC value of a service interface unit is latched at an edge of a current synchronous clock, the latched RTC value is compared with an encoded RTC value later distributed by the central controller to obtain a comparison value, and then the comparison value is latched; the local RTC is corrected at an edge of a next synchronous clock according to the comparison value latched in the last period, and then the value of the local RTC is compared with a distributed RTC value to obtain a comparison value, and the comparison value is latched for next correction; after multiple iterations in the above way, the value of the local RTC is accurately synchronized to the value of the RTC of the main control center. In the second step, the main control center maintains one RTC required to perform long-term time counting and meet a resolution requirement; the RTC is driven by the synchronous clock to automatically increase according to a period T (T is a period of the synchronous clock), the value of the RTC is latched, encoded and sent to an interface unit of the line card or the interface card. If a deviation of the part below T exists according to a software protocol (such as the PTP, what is actually calculated according to the protocol is an RTC value of a slave port of the line card), an offset value is corrected for the RTC at an edge of the synchronous clock, and then the corrected RTC is encoded and distributed. In the third step, an RTC maintenance module of an interface unit of each line card is driven by a local clock related to a service chip; and the synchronous clock is sampled for an RTC value, the RTC value is latched, and the latched RTC value is then compared with a received RTC value distributed by the central controller and is corrected accordingly. In the fourth step, the delay of the backplane distributed by the synchronous clock and the delay of the line card or the interface card are compensated for; and the main control center can automatically test and compensate for the delay of the distributed synchronous update clock according to a specified slot.

With the technical solutions provided by the embodiments of the present disclosure, the synchronization and distribution error of the RTC information of the distributed system can be reduced by two orders of magnitude, so that the synchronization and distribution error of the RTC information in the system does no longer cause a bottleneck to a high-accuracy synchronization index requirement for the whole equipment.

It should be understood by those of ordinary skill in the art that the functions implemented by each unit in the electronic device shown in FIG. 7 can be understood by referring to the above relevant description of the time synchronization method. The functions of each unit in the electronic device shown in FIG. 7 may be implemented by a program running on a processor or by a specific logic circuit.

An embodiment of the present disclosure further provides a computer-readable storage medium configured to store a computer program.

Optionally, the computer-readable storage medium can be applied to a network device disclosed in the embodiments of the present disclosure, and the computer program enables a computer to perform the processes implemented by the network device in all the methods illustrated by the embodiments of the present disclosure. The processes are not repeated here for the conciseness of the description.

Optionally, the computer-readable storage medium can be applied to a mobile terminal/terminal device disclosed in the embodiments of the present disclosure, and the computer program enables a computer to perform the processes implemented by the mobile terminal/terminal device in all the methods illustrated by the embodiments of the present disclosure. The processes are not repeated here for the conciseness of the description.

An embodiment of the present disclosure further provides a computer program product, including computer program instructions.

Optionally, the computer program product can be applied to a network device disclosed in the embodiments of the present disclosure, and the computer program instructions enable a computer to perform the processes implemented by the network device in all the methods illustrated by the embodiments of the present disclosure. The processes are not repeated here for the conciseness of the description.

Optionally, the computer program product can be applied to a mobile terminal/terminal device disclosed in the embodiments of the present disclosure, and the computer program instructions enable a computer to perform the processes implemented by the mobile terminal/terminal device in all the methods illustrated by the embodiments of the present disclosure. The processes are not repeated here for the conciseness of the description.

An embodiment of the present disclosure further provides a computer program.

Optionally, the computer program can be applied to a network device disclosed in the embodiments of the present disclosure. When the computer program runs on a computer, the computer is enabled to perform the processes implemented by the network device in all the methods illustrated by the embodiments of the present disclosure. The processes are not repeated here for the conciseness of the description.

Optionally, the computer program can be applied to a mobile terminal/terminal device disclosed in the embodiments of the present disclosure. When the computer program runs on a computer, the computer is enabled to perform the processes implemented by the mobile terminal/terminal device in all the methods illustrated by the embodiments of the present disclosure. The processes are not repeated here for the conciseness of the description.

It should be noted by those of ordinary skill in the art that the exemplary elements and algorithm steps described in conjunction with the embodiments disclosed herein may be implemented as electronic hardware, or a combination of computer software and electronic hardware. Whether those functions are implemented as hardware or software depends on specific applications and design constraints of the technical solutions. Those of ordinary skill in the art may implement the functions described herein with different methods for each specific application, but those implementations should not be considered to be beyond the scope of the present disclosure.

It is clear to those of ordinary skill in the art that, for the purpose of convenience and conciseness, reference can be made to the corresponding processes in the above method embodiments for the specific operation processes of the above systems, devices and units, which are not repeated here.

It should be understood that the systems, devices and methods disclosed in the above embodiments of the present disclosure may be implemented in other manners. For example, the embodiments of the device described above are merely illustrative. For example, the division of the units is just the division of logical functions, and the units may be divided otherwise in practical applications. For example, a plurality of units or components may be combined, or be integrated into another system, or some features may be omitted or may not be implemented. In addition, the coupling, direct coupling or communication connection between the components shown or discussed may be the indirect coupling or communication connection between some interfaces, devices or units in an electrical or mechanical way or in other forms.

The above units described as separate parts may be physically separate, or may not. The parts shown as units may be physical units, or may not. The units may be located in one place, or distributed in a plurality of network units. Some or all of the units may be selected according to actual needs to achieve the objective of the technical solutions provided by the embodiments.

In addition, all of the functional units disclosed in each embodiment of the present disclosure may be integrated into one processing unit, or each unit may be implemented as a physically independent unit, or two or more units may be integrated into one unit.

If implemented in the form a software functional module and sold or used as an independent product, the above functions may be stored in a computer-readable storage medium. Based on such understanding, the essence of the technical solutions of the present disclosure, or the contribution made by the technical solutions to the related art, or part of the technical solutions may be implemented in the form of a software product, which is stored in a storage medium and includes several instructions to enable computer equipment (which may be a personal computer, a server, a network device, etc.) to execute all or part of the steps of the method described in each embodiment of the present disclosure. The storage medium includes various media capable of storing program codes, such as Universal Serial Bus Flash Disks (USB flash disks), mobile hard disks, Read-Only Memories (ROMs), Random Access Memories (RAMs), magnetic disks and optical discs.

The above description is of the exemplary embodiments of the present disclosure, but the protection scope of the present disclosure is not limited thereto. Those skilled in the art can easily think of changes or substitutions within the technical scope disclosed by the present disclosure, and the changes or substitutions should be considered to fall within the protection scope of the present disclosure. Therefore, the protection scope of the present disclosure should be subject to the protection scope of the claims.

What is claimed is:

1. A time synchronization method, comprising:
sending a clock synchronization signal and first real time clock (RTC) information separately,
wherein the clock synchronization signal is used to measure a delay between a first module and at least one second module, the delay is used for phase compensation performed on the clock synchronization signal received at the at least one second module, and the clock synchronization signal after being subjected to the phase compensation is used to trigger the at least one second module to update local second RTC information to the first RTC information, wherein the clock synchronization signal is transmitted between the first module and the at least one second module in a loopback manner, and the transmission in the loopback manner is configured to measure the delay between the first module and the at least one second module, and wherein the first module comprises a first phase locking loop (PLL) and a logic device, the first PLL separately sends the clock synchronization signal to the at least one second module and the logic device, and receives the clock synchronization signal looped back by the at least one second module; and the logic device receives the clock synchronization signal sent by the first PLL, encodes the first RTC information on the clock synchronization signal and sends the encoded first RTC information to the at least one second module.

2. The method of claim 1, wherein the first module further comprises a port expansion device and a multiplexing device, wherein the port expansion device is configured to increase a number of output ports of the first PLL, receive the clock synchronization signal sent by the first PLL and send multiple clock synchronization signals to a plurality of second modules; and the multiplexing device is configured to receive the multiple clock synchronization signals looped back by the plurality of second modules, select one clock synchronization signal from the multiple clock synchronization signals, and loop the selected one clock synchronization signal back to the first PLL.

3. The method of claim 2, wherein the clock synchronization signal is used to measure the delay between the first module and the at least one second module, comprising:

the clock synchronization signal is used to measure delays of the following devices:

the first PLL and a backplane; or the first PLL, the port expansion device, the multiplexing device and the backplane;

wherein the backplane is a backplane between the first module and the at least one second module; and the measured delays of the devices are used to determine the delay between the first PLL and the at least one second module.

4. The method of claim 3, wherein the multiplexing device selects one clock synchronization signal from the multiple clock synchronization signals and loops the selected one clock synchronization signal back to the first PLL, and then the first PLL measures the delay of the backplane between the first module and the at least one second module based on the selected one clock synchronization signal.

5. The method of claim 3, wherein the first PLL is provided with a first outer loopback line and a second outer loopback line, and the first and second outer loopback lines are looped from an output of the first PLL back to an input of the first PLL; wherein the first PLL outputs a first clock synchronization signal and the first clock synchronization signal is looped back to the first PLL via the first outer loopback line, the first PLL outputs a second clock synchronization signal and the second clock synchronization signal is looped back to the first PLL via the second outer loopback line, and the first and second clock synchronization signals are used by the first PLL to measure the delay of the first PLL.

6. The method of claim 5, wherein the first PLL locks onto a reference clock signal, and an edge of the first clock synchronization signal is aligned with an edge of the reference clock signal when the first PLL locks.

7. The method of claim 5, wherein the port expansion device outputs a third clock synchronization signal and the third clock synchronization signal is looped back to the first PLL by the multiplexing device, a specified delay exists between the third clock synchronization signal output by the port expansion device and the first clock synchronization signal, and the first PLL measures the delay of the multiplexing device based on the looped back third clock synchronization signal.

8. The method of claim 7, wherein the port expansion device outputs a fourth clock synchronization signal and the fourth clock synchronization signal is looped back to the first PLL, and the first PLL measures the delay of the port expansion device based on the looped back fourth clock synchronization signal.

9. The method of claim 8, wherein each of the at least one second module comprises a second PLL and a service chip, the second PLL receives the clock synchronization signal sent by the first PLL and loops the clock synchronization signal back to the first PLL; and the service chip receives the clock synchronization signal sent by the second PLL and loops the clock synchronization signal back to the second PLL.

10. The method of claim 9, wherein the clock synchronization signal is further used to measure a delay between the second PLL and the service chip.

11. The method of claim 10, wherein the clock synchronization signal is further used to measure the delay between the second PLL and the service chip, comprising:

the clock synchronization signal is used to measure a delay of the second PLL and a line delay between the second PLL and the service chip;

wherein the delay of the second PLL and the line delay between the second PLL and the service chip obtained by measurement are used to determine the delay between the second PLL and the service chip.

12. The method of claim 11, wherein the second PLL is provided with a third outer loopback line and a fourth outer loopback line, which are looped from an output of the second PLL back to an input of the second PLL; wherein the second PLL outputs a fifth clock synchronization signal and the fifth clock synchronization signal is looped back to the second PLL via the third outer loopback line, the second PLL outputs a sixth clock synchronization signal and the sixth clock synchronization signal is looped back to the second PLL via the fourth outer loopback line, and the fifth and sixth clock synchronization signals are used by the second PLL to measure the delay of the second PLL.

13. The method of claim 11, wherein the second PLL measures the line delay between the second PLL and the service chip based on the clock synchronization signal received from the service chip.

14. The method of claim 10, wherein a delay between the first PLL and the second PLL and the delay between the second PLL and the service chip are used to determine a delay between the first PLL and the service chip.

15. The method of claim 1, wherein the first RTC information encoded on the clock synchronization signal is transmitted from the first module to the at least one second module through a bus channel.

16. The method of claim 1, wherein the first RTC information at the first module takes the clock synchronization signal as a drive clock signal, and the drive clock signal is used by the first module to increase the first RTC information according to a period of the clock synchronization signal.

17. The method of claim 1, wherein the second RTC information at the at least one second module takes a clock signal at the at least one second module as a drive clock signal, and the drive clock signal is used by the at least one second module to increase the second RTC information according to a period of the clock signal.

18. An electronic device, comprising:
a first module; and
at least one second module,
wherein
the first module is configured to send a clock synchronization signal and first real time clock RTC information separately,
wherein the clock synchronization signal is used to measure a delay between the first module and the at least one second module, the delay is used for phase compensation performed on the clock synchronization signal received at the at least one second module, and the clock synchronization signal after being subjected to the phase compensation is used to trigger the at least one second module to update local second RTC information to the first RTC information,
wherein the clock synchronization signal is transmitted between the first module and the at least one second module in a loopback manner, and the transmission in the loopback manner is configured to measure the delay between the first module and the at least one second module, and
wherein the first module comprises a first phase locking loop (PLL) and a logic device,
the first PLL separately sends the clock synchronization signal to the at least one second module and the logic device, and receives the clock synchronization signal looped back by the at least one second module; and
the logic device receives the clock synchronization signal sent by the first PLL, encodes the first RTC information on the clock synchronization signal and sends the encoded first RTC information to the at least one second module.

* * * * *